Figure 1:
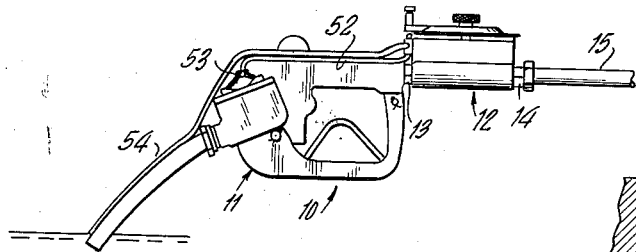

April 10, 1962     M. J. FLORIO     3,028,997

FLUID FLOW MEASURING AND DISPENSING APPARATUS

Filed June 23, 1959

INVENTOR.
MICHAEL J. FLORIO
BY James J. Cannon
ATTORNEY

United States Patent Office 3,028,997
Patented Apr. 10, 1962

3,028,997
FLUID FLOW MEASURING AND DISPENSING
APPARATUS
Michael J. Florio, 1550 Silver St., Bronx, N.Y.
Filed June 23, 1959, Ser. No. 822,361
1 Claim. (Cl. 222—20)

My invention relates to a fluid flow measuring and dispensing apparatus and is directed particularly to novel apparatus of this class for dispensing a predetermined volume of fluid.

The principal object of my invention is to provide an improved flow dispensing and metering apparatus of the above nature which is particularly adaptable for use in retailing gasoline and the like liquid fuels.

A more particular object is to provide a dispensing apparatus of the above nature including a nozzle and a metering device attached to the nozzle having dial mechanism presettable to the quantity of liquid to be dispensed and operative to automatically shut off flow when the predetermined volume of fluid has been dispensed.

Still another object of my invention is to provide a fluid dispensing and metering apparatus of the character described including means for automatically shutting off fluid flow upon the filling of a tank into which the fluid is being dispensed, regardless of the quantity for which the metering device has been preset.

Another object is to provide a novel flow dispensing and metering apparatus of the above nature which will be simple in construction, low in cost, long wearing in use and foolproof in operation.

Figure 5:
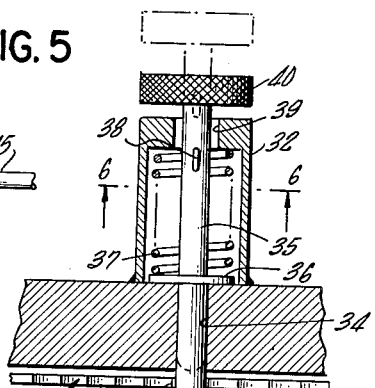
Figure 2:
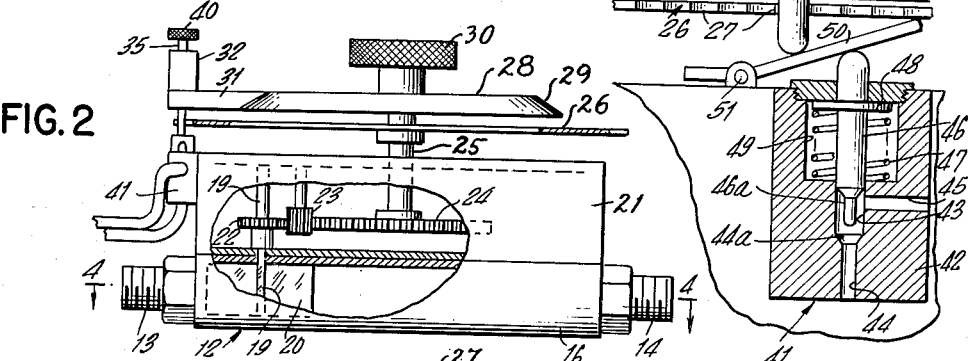
Figure 3:
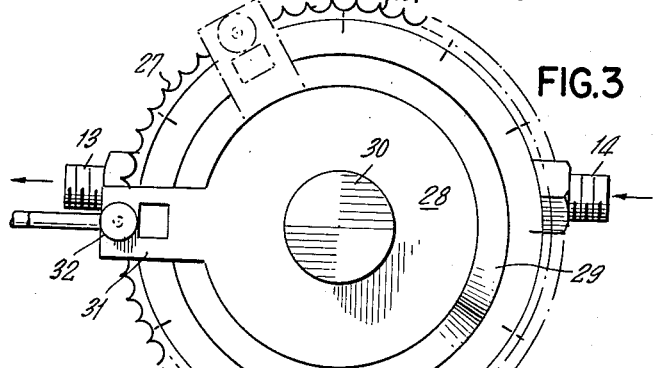
Figure 6:
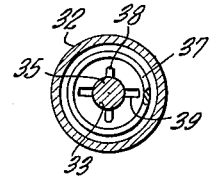
Figure 4:
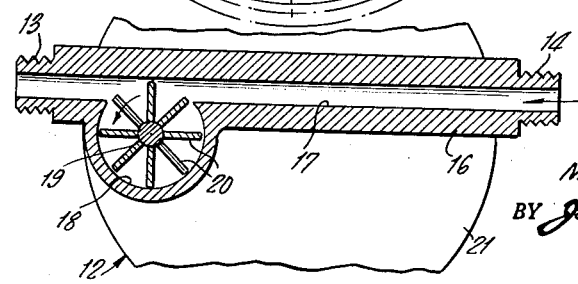

Other objects, features and advantages of my invention will be apparent from the following description when read with reference to the accompanying drawing. In the drawing, wherein like reference numerals denote corresponding parts throughout the several views:

FIG. 1 is a side view of a fluid flow measuring and dispensing apparatus embodying the invention, FIG. 2 is a side elevational view, with portions broken away, of the metering device, shown separately and on an enlarged scale, FIG. 3 is a top view of the metering device, shown separately, FIG. 4 is a horizontal cross-sectional view, taken along the line 4—4 of FIG. 2 in the direction of the arrows and illustrating details of construction of the metering device, FIG. 5 is a fragmentary view of the metering device showing the stop mechanism thereof in vertical cross-section and on an enlarged scale, FIG. 6 is a horizontal cross-section taken along the line 6—6 of FIG. 5 in the direction of the arrows.

Referring now in detail to the drawings, reference numeral 10 in FIG. 1 designates generally a fluid flow metering and dispensing apparatus embodying my invention, the same comprising a nozzle mechanism 11 and a metering device 12 having an outlet fitting 13 secured to the inlet opening of the nozzle mechanism and an inlet fitting 14 adapted to be connected to a hose 15 supplying the fluid to be dispensed under presure. As best illustrated in FIG. 4 the outlet and inlet fittings 13 and 14 are formed at the ends of an elongated body member 16 having a longitudinal bore 17 communicating between said fittings and providing a flow path for the fluid to be dispensed. The body member 16 is formed near the outlet fitting 13 thereof and at one side with a cylindrical chamber 18 communicating with the bore 17, rotatably journalled within which is a shaft 19 provided with a plurality, eight, in the embodiment illustrated, of close-fitting vanes 20 the outer ends of which pass in closely-spaced relation to the distal wall portion of the bore 17. The shaft 19 extends upwardly through a circular gear housing member 21 secured against the upper end of the body member 16, and carried within said gear housing member a spur gear 22 in mesh with a pinion 23 rotatably journalled in said gear housing member. The pinion 23 is in mesh with a gear 24 fixed at one end of a shaft 25 journalled in the gear housing member 21 and extending upwardly centrally through the upper end thereof. Keyed to the shaft 25 in spaced relation above the top of the gear housing member 21 is a circular setting dial 26 the periphery of which is formed with recesses 27 for the purpose hereinafter appearing. Rotatably mounted on the shaft 25 in spaced relation above the setting dial 26 is a dial 28 of lesser diameter than the dial 26 and having a beveled peripheral edge 29. A knurled reset knob 30 is fixed upon the outermost end of the shaft 25.

The dial 28 is formed with a laterally-projecting support member 31 upon which a cylindrical pin housing member 32 is secured, as by welding. The housing member 32 and the support member 31 are provided with vertically aligned openings 33 and 34 respectively, within which a setting pin 35 is vertically disposed (see FIGS. 5 and 6). The pin 35 is provided with a collar 36 adapted to seat against the upper surface of the support member 31 and thus limit the downward movement of said pin. A coil spring 37 is arranged within the pin housing member 32, circumadjacent the pin 35 and constrained between the upper surface of the collar 36 and the interior upper end of said housing member normally holds said pin in its lowermost position at which it projects through the underside of the supporting member 31. The setting pin 35 is so disposed and arranged with respect to the periphery of the setting dial 26, and is of such diameter that it fits in embracing relationship within one of said peripheral recesses 27 therein to join the setting dial 26 and the dial 28 so that they can only rotate in unison.

Means is provided for moving and maintaining the setting pin 35 in withdrawn position so that the dials 26 and 28 can be moved independently of one another. To this end, the pin 35 is fitted with a cross pin 38 and the opening 33 in the upper end of the housing member 32 is provided with a cross groove 39 allowing passage therethrough of said pin. Turning the knurled head 40 on the outer end of the pin 35 so that the cross pin 38 will pass through the groove 39 will allow said pin to be pulled upwardly against the force of spring 37 from the position illustrated in full lines in FIG. 5 to the dotted line position wherein it is wtihdrawn from engagement with a recess 27 of the setting dial 26. Turning of the pin 35 from registry with the groove 39 will then cause cross pin 38 to abut upon the top of the housing member 32, thereby holding it in withdrawn position.

As best illustrated in FIG. 5, means cooperative with the setting pins 35 is provided for automatically shutting off the flow of liquid once a given preset amount has been dispensed. To this end a valve member 41 is fixed against the side of the housing member 21, said valve member comprising a valve body 42 formed with which is a cylindrical chamber 43 communicating at its lower end with an air passage 44 and at the side thereof with an air passage 45. A valve closure plunger 46 is slidably arranged in the cylindrical chamber 43 and normally held in withdrawn position by means of a coil spring 47 surrounding said plunger and constrained between a collar 48 fixed thereon and the annular seat at the bottom of a cylindrical opening 49 formed in the valve body 42 above and coaxial with the chamber 43 therein. As illustrated in FIG. 5, the upper end of the plunger 46 is rounded and normally projects through the upper end of the valve body 42 so that there is communication between the air passages 44 and 45 through the chamber 43.

Means are provided to depress the plunger 46 and shut off air flow between the air passages 44 and 45 at which time pin 46 is seated at 44a and 46a is guided into air passage 44 thus providing an airtight seal when a preset amount of liquid has been dispensed. To this end, a slide 50 is hinged at 51 to the top of the valve body 42 and overlies the top of the plunger 46 (see FIG. 5), said slide being so arranged and positioned that upon turning of the downwardly projecting setting pin 35 together with the dials 26 and 28 during the dispensing of fluid, it will eventually ride upon said slide and force it downwardly to depress the plunger 46. Since the air passage 44 is connected by means of an air tube 52 to the vacuum chamber 53 of the nozzle mechanism 11, blocking of the air tube 52 will cause said nozzle mechanism to operate its shut off valve in the usual manner. Since the air passage 45 is connected to an air tube 54 which terminates just short of the end of the dispensing nozzle, air flow will be blocked off upon the dispensed fluid reaching the level of the end of the nozzle as when a tank being filled is nearly full, thereby automatically shutting off fluid flow regardless of the amount to which the metering mechanism has been preset.

As illustrated in FIG. 3 the periphery of the present dial 26 is calibrated in terms of gallons in two gallon intervals, each recess 27 representing one-fifth of a gallon. In use, the setting pin 35 will be withdrawn and the dial 28 moved with respect to the setting dial 26 until said setting pin is in alignment with the recess 27 corresponding to the amount of fluid to be dispensed, at which position said setting pin will be depressed and locked in position as described above. The dials will then be turned in unison to the start position, represented by the position of the setting dial in FIG. 3. Operation of the usual flow trigger of the nozzle mechanism 11 will start the flow of liquid. In flowing through the chamber 18, vanes 20 will be actuated to turn the shaft 25 through the gear train 22, 23, 24. When an amount of fluid corresponding to the amount preset on the metering device has been dispensed, the setting pin 35 will have reached the slide 50 and depressed the plunger 46, thereby shutting off the flow of fluid in the manner hereinabove described.

While I have illustrated and described herein one form in which my invention may conveniently be embodied in practice, it is to be understood that this form is presented by way of example only and not in a limiting sense. The invention is limited only by the scope and spirit of the following claim.

What I claim as new and desire to secure by Letters Patent is:

In a liquid dispensing apparatus including a dispensing nozzle having air-actuated shut off means, and a supply hose, the provision of a measuring and flow controlling device comprising a body member having a longitudinal bore, means interconnecting opposed ends of said body with said hose and with said nozzle, a housing member mounted on said body, a valve body affixed to said housing member and having a chamber located therein and a pair of passageways extending from said chamber to the outer side of the valve body, a valve in said chamber, a valve stem for said valve extending outwardly of said valve body, spring means normally urging said valve to open condition and said stem outwardly of said body, a tube interconnecting one of said passageways with said shut off means in said nozzle, a further tube extending from the other passageway to a point adjacent the outer end of said nozzle, a shaft mounted in said housing and extending outwardly therefrom, a setting dial affixed to said shaft outwardly of the housing and having a series of recesses formed in the periphery thereof, a second dial rotatably mounted on said shaft coaxially outwardly of said setting dial, a support member extending from one side of said second dial, a setting pin reciprocably mounted in said support and spring urged into normal locking engagement in a recess of said setting dial, a slide member pivoted upon said housing and normally spring urged outwardly by said valve stem, said setting pin adapted to move said stem inwardly of said valve body to close said valve when said setting pin is in contact with said slide member, means for latching said setting pin in unengaged position with respect to said recesses, and means operable by the flow of fluid in said bore for rotating said shaft, said last named means including a paddlewheel rotatably mounted in said housing and having its blades extending into said bore and gear means in said housing interconnecting said paddlewheel and said shaft, said means for latching the setting pin in unengaged position including a cover for said supporting member having a central opening for said setting pin, said opening having a pair of diametrically opposite axially extending grooves therein, a cross pin affixed to said setting pin inwardly with respect to said cover, and a handle on the outer end of said setting pin.

References Cited in the file of this patent
UNITED STATES PATENTS

| | | |
|---|---|---|
| 1,079,103 | Bowser | Nov. 18, 1913 |
| 1,917,364 | Gallagher | July 11, 1933 |
| 2,698,111 | Wiley | Dec. 28, 1954 |